United States Patent
Pichler et al.

(10) Patent No.: US 11,875,214 B2
(45) Date of Patent: Jan. 16, 2024

(54) RFID TRANSPONDER HAVING MODIFIABLE SETTINGS

(71) Applicant: NXP B.V., Eindhoven (NL)

(72) Inventors: Thomas Pichler, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/305,071

(22) Filed: Jun. 30, 2021

(65) Prior Publication Data
US 2022/0027581 A1    Jan. 27, 2022

(30) Foreign Application Priority Data
Jul. 27, 2020   (EP) ..................................... 20187996

(51) Int. Cl.
*G06K 7/10*    (2006.01)
*G06K 19/07*   (2006.01)

(52) U.S. Cl.
CPC ..... *G06K 7/10198* (2013.01); *G06K 7/10297* (2013.01); *G06K 7/10346* (2013.01); *G06K 19/0723* (2013.01)

(58) Field of Classification Search
CPC ........... G06K 7/10198; G06K 7/10297; G06K 7/10346; G06K 19/0723
See application file for complete search history.

(56) References Cited

U.S. PATENT DOCUMENTS

| | | | |
|---|---|---|---|
| 5,450,492 A * | 9/1995 | Hook | G06K 19/0723 340/10.2 |
| 5,751,223 A | 5/1998 | Turner | |
| 5,883,582 A * | 3/1999 | Bowers | G08B 13/2485 340/10.2 |
| 6,147,606 A * | 11/2000 | Duan | G06K 19/07786 343/873 |
| 6,236,315 B1 * | 5/2001 | Helms | H01Q 21/29 343/866 |
| 6,535,109 B1 * | 3/2003 | Mahdavi | G06K 7/0008 340/10.5 |
| 6,727,810 B1 * | 4/2004 | Martin | G08B 13/2462 340/505 |
| 6,891,474 B1 * | 5/2005 | Fletcher | G06K 19/07749 340/572.1 |

(Continued)

FOREIGN PATENT DOCUMENTS

| | | |
|---|---|---|
| DE | 102005059507 A1 | 7/2006 |
| EP | 2620895 B1 | 12/2015 |
| WO | 02103645 A2 | 12/2002 |

*Primary Examiner* — Curtis J King

(57) ABSTRACT

In accordance with a first aspect of the present disclosure, a radio frequency identification (RFID) transponder is provided, comprising: a receiver configured to receive a command from an external RFID reader, wherein the command is a first command transmitted by the RFID reader during a communication session and wherein said command comprises a at least one parameter indicative of one or more modifiable settings of the RFID transponder; and a controller configured to modify the settings of the RFID transponder in accordance with a value of said parameter. In accordance with a second aspect of the present disclosure, a corresponding method of operating a radio frequency identification (RFID) transponder is conceived.

14 Claims, 6 Drawing Sheets

(56) References Cited

U.S. PATENT DOCUMENTS

| | | | |
|---|---|---|---|
| 7,245,911 B2 | 7/2007 | Kim | |
| 8,207,828 B2 | 6/2012 | Hanebeck | |
| 8,698,629 B1* | 4/2014 | Stanford | H04L 67/34 340/10.5 |
| 10,114,985 B2 | 10/2018 | Nikitin et al. | |
| 2003/0052161 A1* | 3/2003 | Rakers | G06K 19/0723 235/375 |
| 2003/0133435 A1 | 7/2003 | Friedrich | |
| 2003/0174070 A1* | 9/2003 | Garrod | H04L 43/00 340/870.07 |
| 2003/0231105 A1* | 12/2003 | Kim | G06K 7/0008 340/10.2 |
| 2004/0036575 A1* | 2/2004 | Patterson | G06K 7/0008 340/10.2 |
| 2004/0065733 A1* | 4/2004 | Fukuoka | G06K 7/10029 235/435 |
| 2004/0178911 A1* | 9/2004 | Sakamoto | G08B 13/2485 340/572.4 |
| 2005/0088286 A1* | 4/2005 | Heinrich | G08C 17/02 340/10.51 |
| 2005/0099299 A1* | 5/2005 | Tyroler | G08B 21/24 340/8.1 |
| 2006/0092040 A1* | 5/2006 | Fishkin | G06K 17/00 340/539.13 |
| 2006/0103534 A1* | 5/2006 | Arms | G06K 19/0716 340/5.1 |
| 2007/0046432 A1* | 3/2007 | Aiouaz | G06K 17/0022 340/572.1 |
| 2007/0069863 A1* | 3/2007 | Akiyama | H04B 5/0056 340/10.2 |
| 2007/0075840 A1* | 4/2007 | Brandt | G01D 21/00 340/10.41 |
| 2007/0080782 A1* | 4/2007 | Breitfuss | G06K 7/0008 340/505 |
| 2007/0096883 A1* | 5/2007 | Kim | G06K 13/00 235/375 |
| 2007/0096909 A1* | 5/2007 | Lally | G06K 7/0008 340/521 |
| 2007/0132581 A1* | 6/2007 | Molyneaux | G01R 33/288 340/572.1 |
| 2007/0194936 A1* | 8/2007 | Hoshina | G06K 7/0008 340/10.51 |
| 2007/0290802 A1* | 12/2007 | Batra | G06K 7/0008 340/572.1 |
| 2008/0018431 A1* | 1/2008 | Turner | G06K 7/0008 340/10.2 |
| 2008/0106381 A1 | 5/2008 | Adamec et al. | |
| 2008/0106383 A1* | 5/2008 | Choi | G06K 7/0008 340/10.2 |
| 2008/0169909 A1* | 7/2008 | Park | G06F 21/35 340/10.4 |
| 2008/0290995 A1* | 11/2008 | Bruns | G06K 7/0008 340/10.1 |
| 2009/0134973 A1* | 5/2009 | Sandler | G08B 21/0213 340/10.1 |
| 2009/0146787 A1* | 6/2009 | Park | G06K 7/0008 340/10.1 |
| 2009/0303014 A1* | 12/2009 | Brommer | G06K 19/0723 340/10.2 |
| 2010/0156610 A1* | 6/2010 | Wild | G06K 7/0008 340/10.34 |
| 2010/0214081 A1* | 8/2010 | Huang | G06K 19/0723 340/10.52 |
| 2010/0237994 A1* | 9/2010 | Carraher | H04L 41/12 340/10.1 |
| 2010/0277320 A1* | 11/2010 | Gold | G06K 19/07749 340/572.1 |
| 2011/0298592 A1* | 12/2011 | Sugiyama | G06K 7/0008 340/10.51 |
| 2012/0146774 A1* | 6/2012 | Kasai | G06K 7/10445 340/10.42 |
| 2012/0161963 A1* | 6/2012 | Herrala | G06Q 10/06 340/539.13 |
| 2013/0009755 A1* | 1/2013 | Hong | G06K 7/10118 340/10.33 |
| 2013/0122803 A1* | 5/2013 | Forster | H04B 7/155 455/11.1 |
| 2014/0085058 A1* | 3/2014 | Horst | G06K 7/10356 340/10.51 |
| 2014/0111310 A1* | 4/2014 | Bae | G06K 7/10297 340/10.3 |
| 2014/0124493 A1* | 5/2014 | Enyedy | B23K 9/1006 219/137 PS |
| 2016/0021849 A1* | 1/2016 | Loosveld | G01S 5/16 340/573.3 |
| 2017/0124361 A1* | 5/2017 | Wilfred | H04L 67/52 |
| 2018/0349777 A1* | 12/2018 | Koseki | G06N 5/046 |
| 2020/0372313 A1* | 11/2020 | Pichler | G06K 19/073 |

\* cited by examiner

US 11,875,214 B2

RFID TRANSPONDER HAVING MODIFIABLE SETTINGS

CROSS-REFERENCE TO RELATED APPLICATIONS

This application claims priority under 35 U.S.C. § 119 to European Patent Application No. 20187996.2, filed on Jul. 27, 2020, the contents of which are incorporated by reference herein.

TECHNICAL FIELD

The present disclosure relates to a radio frequency identification (RFID) transponder. Furthermore, the present disclosure relates to a corresponding method of operating an RFID transponder.

BACKGROUND

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders. RFID transponders may have predefined settings in order to meet, for example, safety regulations in various countries or regions around the world. Such predefined settings may be difficult to change, resulting in a limited functionality that can be offered by RFID transponders of the kind set forth.

SUMMARY

In accordance with a first aspect of the present disclosure, a radio frequency identification (RFID) transponder is provided, comprising: a receiver configured to receive a command from an external RFID reader, wherein the command is a first command transmitted by the RFID reader during a communication session and wherein said command comprises a at least one parameter indicative of one or more modifiable settings of the RFID transponder; and a controller configured to modify the settings of the RFID transponder in accordance with a value of said parameter.

In one or more embodiments, the parameter is specific to a predefined country or geographical region.

In one or more embodiments, the command is a broadcast command.

In one or more embodiments, the modifiable settings include hardware settings of the RFID transponder.

In one or more embodiments, the hardware settings include transmitter settings and/or receiver settings.

In one or more embodiments, the hardware settings include modulator settings.

In one or more embodiments, the hardware settings include voltage limiter settings.

In one or more embodiments, the hardware settings include charge pump settings.

In one or more embodiments, the modifiable settings include settings indicative of an internal state of the RFID transponder.

In one or more embodiments, the modifiable settings include a frequency bandwidth in which the RFID transponder operates.

In one or more embodiments, the RFID transponder is an RFID tag or an RFID card.

In one or more embodiments, a communication system comprises an RFID transponder of the kind set forth and the RFID reader, wherein said RFID reader is configured to transmit the command to the RFID transponder.

In accordance with a second aspect of the present disclosure, a method of operating a radio frequency identification (RFID) transponder is conceived, comprising: receiving, by a receiver comprised in the RFID transponder, a command from an external RFID reader, wherein the command is a first command transmitted by the RFID reader during a communication session and wherein said command comprises a at least one parameter indicative of one or more modifiable settings of the RFID transponder; and modifying, by a controller comprised in the RFID transponder, the settings of the RFID transponder in accordance with a value of said parameter.

In one or more embodiments, the parameter is specific to a predefined country or geographical region.

In one or more embodiments, the command is a broadcast command.

DESCRIPTION OF DRAWINGS

Embodiments will be described in more detail with reference to the appended drawings, in which.

DESCRIPTION OF EMBODIMENTS

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders. RFID transponders may have predefined settings in order to meet, for example, safety regulations in various countries or regions around the world. Such predefined settings may be difficult to change, resulting in a limited functionality that can be offered by RFID transponders of the kind set forth.

RFID communication may be based, for example, on inductive coupling, capacitive coupling or radiative coupling. The communication between an RFID reader and an RFID transponder, such as an RFID tag, is often realized by means of load modulation and can be split into a forward link and a return link. More specifically, the RFID reader may transmit commands to the RFID transponder through a forward link, and the RFID transponder may transmit responses to those commands back to the RFID reader through a return link. The RFID transponder contains a modulator, which load modulates a carrier signal. Different types of load modulation exist, for example active load modulation (ALM) and passive load modulation (PLM). The return link may also be referred to as a backscatter signal or more concisely as "backscatter".

As mentioned above, RFID transponders may have predefined settings which are difficult to change. For instance, all wireless products have to ensure that country-specific regulations are met. Typically this is achieved by a specific country-dependent user configuration, a country-specific hardware configuration, or by limiting the power to a level which fulfills all regulations (i.e., in the USA, UHF regulations allow 3 dB—two times—more power). This may result in an overhead in terms of development effort. Furthermore, in order to meet all regulations the performance of the device may be negatively affected, in particular in circumstances in which strict rules do not apply. Furthermore, a user may still be able to change the configuration and thereby violate a regulation. As an example, in RFID systems tags are typically designed to fulfill worldwide requirements (i.e., country regulations as well as reader-specific requirements. This may result in a non-optimal performance as well as an increased customer effect to ensure that all requirements are met.

Figure 1:
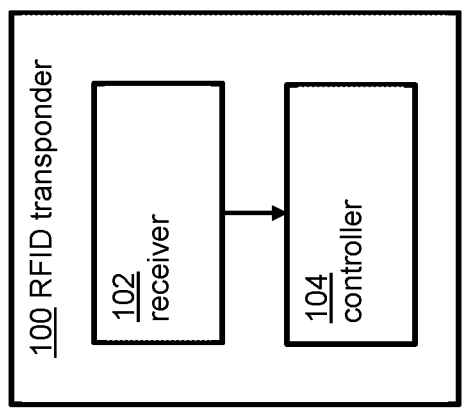
FIG. 1 shows an illustrative embodiment of an RFID transponder.

FIG. 1 shows an illustrative embodiment of an RFID transponder 100. The RFID transponder 100 includes a receiver 102 and a controller 104. The receiver 102 is configured to receive a command from an external RFID reader (not shown), wherein the command is a first command transmitted by the RFID reader during a communication session and wherein said command comprises at least one parameter indicative of one or more modifiable settings of the RFID transponder 100. Furthermore, the controller 104 is configured to modify the settings of the RFID transponder 100 in accordance with a value of said parameter. In this way, the settings can easily be modified to achieve a trade-off between performance and compliance with various regulations. More specifically, the settings can be modified at the beginning of a communication session between the RFID reader and the RFID transponder. In other words, all responses transmitted by the RFID transponders will be transmitted using the modified settings, until for instance the settings are modified again at the beginning of the next communication session. Since the command is the first command sent by the RFID reader during a communication session, it effectively initiates the communication session and ensures that the correct settings are used during the entire session. Accordingly, in this way, the performance of the RFID transponder may be optimized during the whole communication session.

In one or more embodiments, the parameter is specific to a predefined country or geographical region. In this way, the compliance with country-specific or region-specific regulations can be ensured. Furthermore, in a practical implementation, the command is a broadcast command. In this way, the RFID transponder can easily be managed by a broadcasting reader. As mentioned above, the broadcast is effectively the first command sent by the RFID reader during a communication session.

In one or more embodiments, the modifiable settings include hardware settings of the RFID transponder. By modifying hardware settings of the RFID transponder, the compliance with regulations or other requirements (such as technical requirements on the RFID transponders imposed by the reader infrastructure, for example) may be easily ensured. In a practical implementation, the hardware settings include transmitter settings and/or receiver settings. It is noted that the transmitter and receiver of a transponder may also be combined in a single unit referred to as a transceiver. In that case, the hardware settings may include transceiver settings. Furthermore, it is noted that the transmitter settings and/or receiver settings can easily be modified. For instance, the strength of the signal transmitted by the RFID transponder's transmitter can be limited by the controller, to avoid that the signal strength exceeds a prescribed maximum strength. In the context of the present disclosure, the transmitter includes the transistors or devices for enabling communication with the RFID reader, such as the back modulator or the amplifier of the RFID transponder.

Furthermore, in one or more embodiments, the hardware settings include modulator settings. By modifying the settings of the RFID transponder's modulator, for instance the modulation strength, the compliance with regulations and requirements of the kind set forth may be further facilitated. Furthermore, the hardware settings may include voltage limiter settings and/or charge pump settings. The modification of these settings further facilitates the aforementioned compliance with various regulations and requirements.

In one or more embodiments, the modifiable settings include settings indicative of an internal state of the RFID transponder. In the context of the present disclosure, modifying settings indicative of the internal state may include changing the configuration of a state machine, for example by applying other states and/or combinations of states. In this way, the operation of the RFID transponder can easily be adapted. Furthermore, in one or more embodiments, the modifiable settings include a frequency bandwidth in which the RFID transponder operates. Country-specific or region-specific regulations often prescribe a frequency bandwidth in which an RFID transponder should operate. Thus, in accordance with the present disclosure, this frequency bandwidth may easily be adjusted in response to receiving a command which carries information about the country or regions in which the RFID transponder should operate. In a practical implementation, the RFID transponder is an RFID tag or an RFID card.

Figure 2:
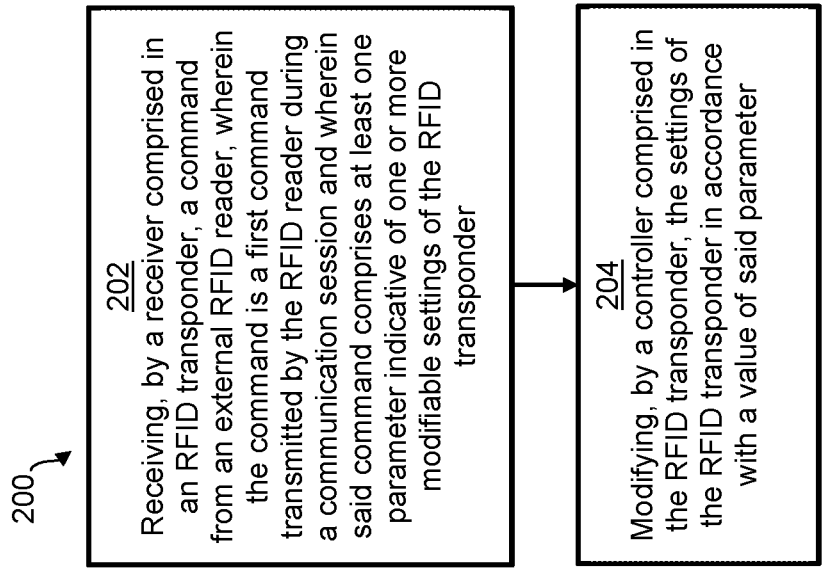
FIG. 2 shows an illustrative embodiment of a method of operating an RFID transponder.

FIG. 2 shows an illustrative embodiment of a method 200 of operating an RFID transponder. The method 200 comprises the following steps: at 202, receiving, by a receiver comprised in an RFID transponder, a command from an external RFID reader, wherein said command comprises at least one parameter indicative of one or more modifiable settings of the RFID transponder, and at 204, modifying, by a controller comprised in the RFID transponder, the settings of the RFID transponder in accordance with a value of said parameter. As mentioned above, in this way, the settings can easily be modified to achieve a trade-off between performance and compliance with various regulations.

Figure 3:
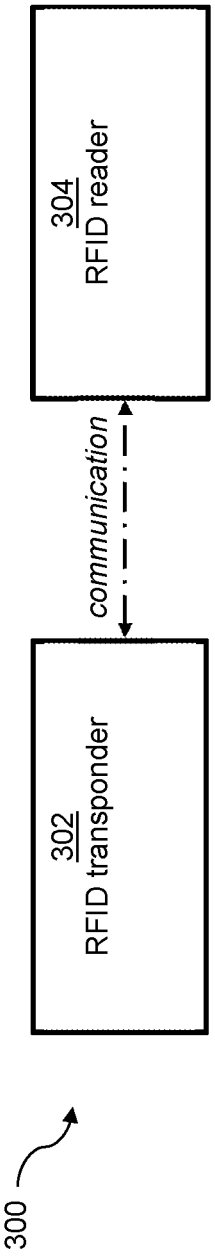
FIG. 3 shows an illustrative embodiment of a communication system.

FIG. 3 shows an illustrative embodiment of a communication system 300. The communication system 300 comprises an RFID transponder 302 of the kind set forth and an RFID reader 304. The RFID reader 304 is configured to transmit a command to the RFID transponder. In accordance with the present disclosure, said command comprises a parameter indicative of one or more modifiable settings of the RFID transponder 302. The RFID transponder 302 comprises a receiver (not shown) configured to receive the command. Furthermore, the RFID transponder 302 comprises a controller (not shown) configured to modify the settings of the RFID transponder 302 in accordance with a value of said parameter.

Figure 4:
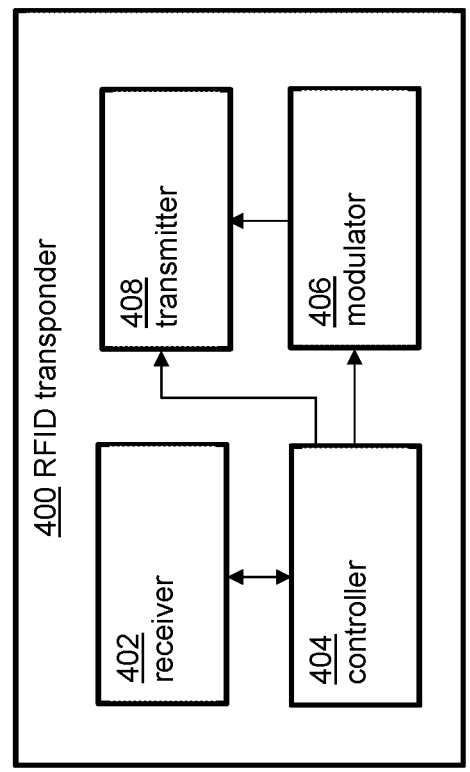
FIG. 4 shows another illustrative embodiment of an RFID transponder.

FIG. 4 shows another illustrative embodiment of an RFID transponder 400. The RFID transponder 400 comprises a receiver 402, a controller 404, a modulator 406 and a transmitter 408. The receiver 402 is configured to receive a command from an external RFID reader (not shown). The command comprises a parameter indicative of one or more modifiable settings of the RFID transponder 400. The controller 404 is configured to modify the settings of the RFID transponder 400 in accordance with a value of said parameter. For example, the parameter may indicate a maximum modulation strength of the transponder 400, a maximum strength of signals transmitted by the transmitter 408, and/or charge pump settings that influence the extent to which a voltage derived from a signal received by the receiver 402 is boosted by a charge pump (not shown). For instance, the charge pump settings may define the number of charge pump stages that are used to boost said voltage. The charge pump may be integrated into the receiver 402, in which case the charge pump settings may be regarded as a specific example of modifiable receiver settings. It is noted that the controller 404 may change the modulation strength of the transponder 400 by controlling the transmitter 408. More specifically, the modulator 406 typically generates a modulation pattern, while the transmitter 408 performs signal shaping and level shifting and thus regulates the strength of the transmitted, modulated signal. Similarly, the controller 404 may control the transmitter 408 in such a way that the transmitter 408 does not transmit signals that exceed a predefined maximum signal strength, provided that such a maximum signal strength is directly specified by the parameter. Accordingly, both a specified maximum modulation strength and a specified maximum signal strength may trigger the controller 404 to cause the transmitter 408 to reduce the strength of the transmitted signals.

Figure 5:
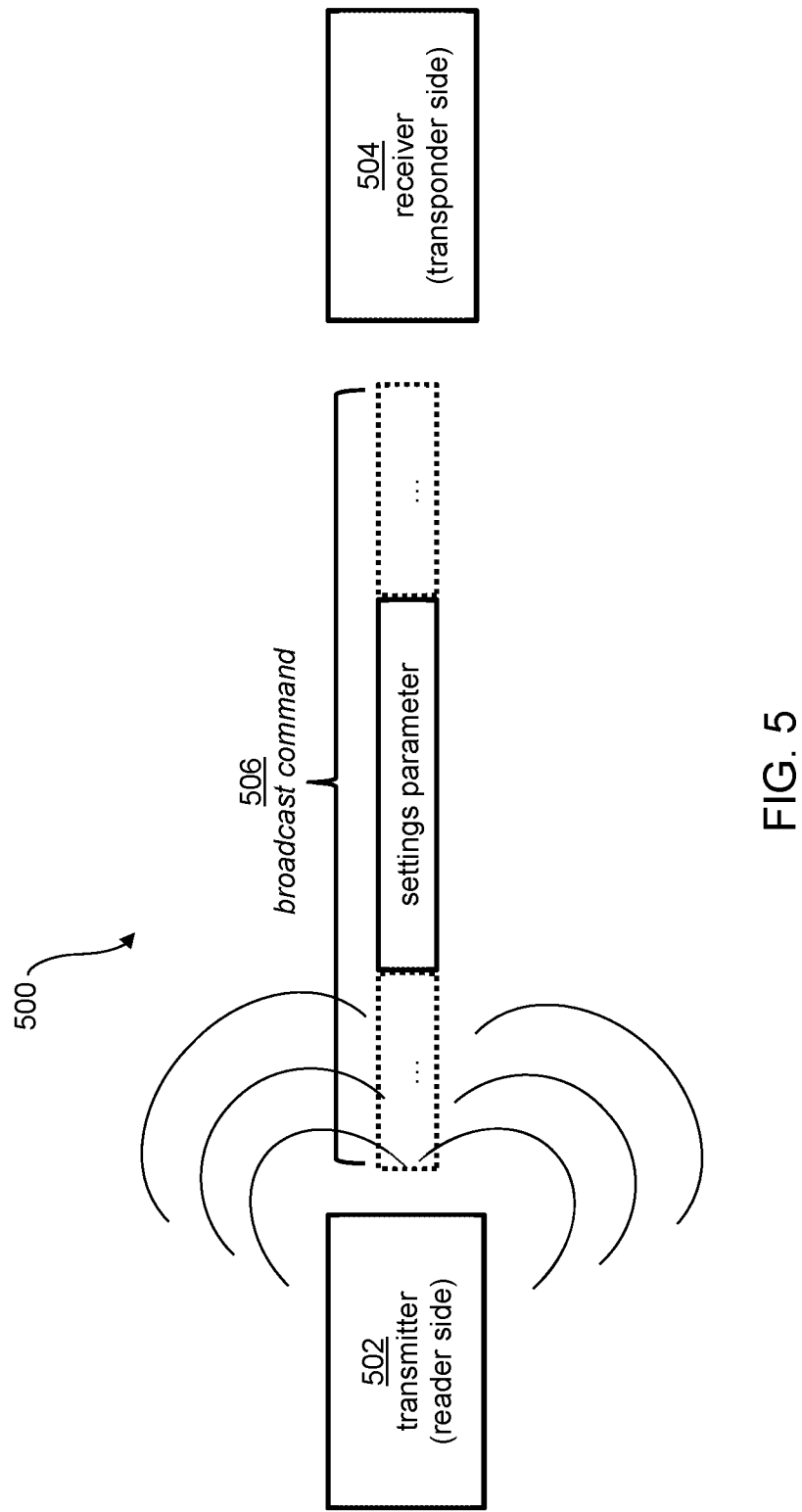
FIG. 5 shows an illustrative embodiment of a command transmission.

FIG. 5 shows an illustrative embodiment of a command transmission 500. A transmitter 502 on the reader side broadcasts a command 506, which is received by a receiver 504 on the transponder side. The transponder may for example be a ultra-high frequency (UHF) RFID transponder. The broadcast command 506 is a first command sent by the transmitter 502 during a communication session, and it includes a settings parameter, i.e. a parameter indicative of one or more modifiable settings of the RFID transponder. The settings parameter may be indicative of country-specific or region-specific settings, or settings specific to a particular type of reader or application. The broadcast command 506 may be a first command in a communication session between the reader and the transponder, according to a predefined communication protocol. It is noted that the first command may be an uncoded command or a coded command. In the context of the present disclosure, coding a command may include encrypting a command or applying a cover code to the command. Furthermore, it is noted that not only the parameter value may differ between various countries, regions, readers or applications, but also the command itself may differ between them. The receiver 504 may decode the command including the settings parameter, or merely extract the settings parameter from the command if the command is uncoded. Subsequently, a controller of the transponder may modify or configure for example the hardware settings, internal state, return link strength, charge pump state and/or another device setting in dependence on the value of the settings parameter. The modified settings may then be retained until the next communication session, for example.

Figure 6:
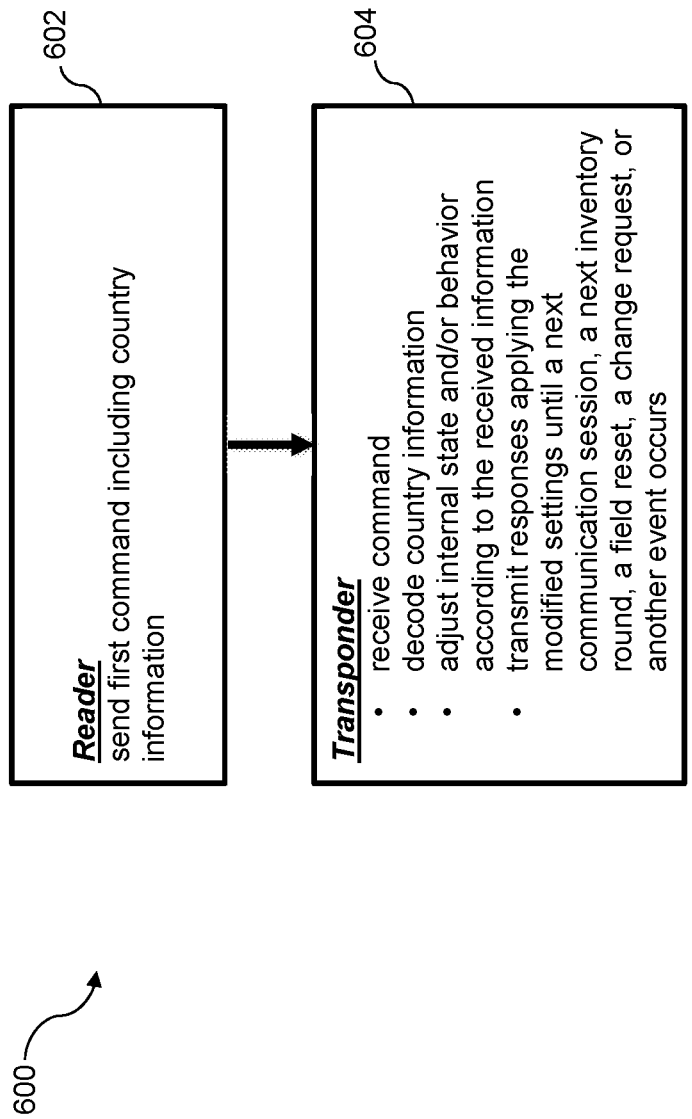
FIG. 6 shows an illustrative embodiment of a transponder settings modification.

FIG. 6 shows an illustrative embodiment of a transponder settings modification 600. The settings modification 600 includes sending 602, by a reader, a first command of a communication session with a transponder. The first command includes country information, i.e. a settings parameter which is indicative of country-specific settings of the transponder. Furthermore, the settings modification 600 includes various steps 604 performed by the transponder. These steps 604 include receiving the command, decoding or extracting the country information, adjusting the internal state and/or transponder behavior (e.g. as influenced by hardware settings of the transponder) according to the received information, and transmitting responses to the reader while applying the modified settings until a next communication session, a next inventory round, a field reset, a change request, or another event occurs.

Figures 7A, 7B:
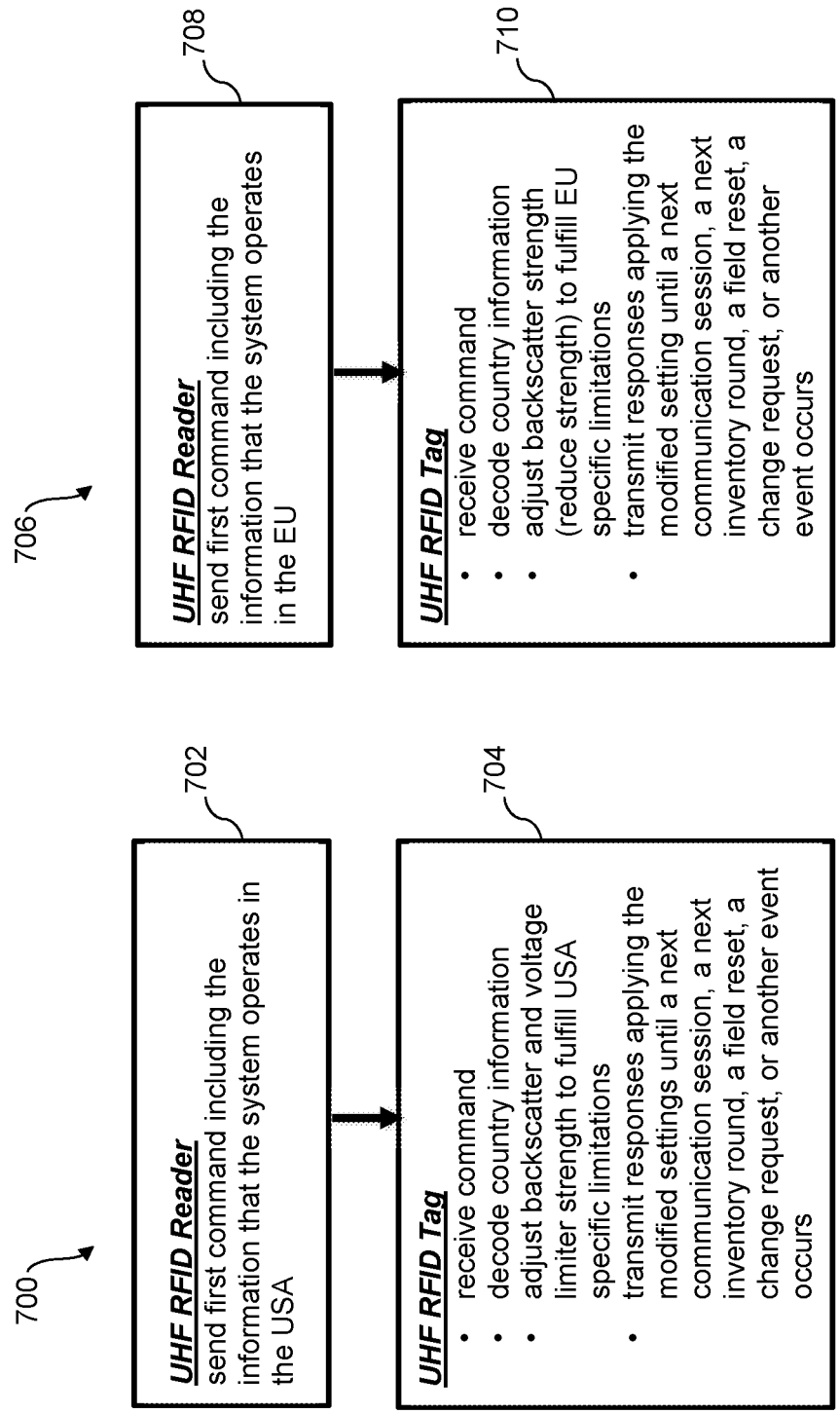
FIG. 7A shows an illustrative embodiment of a UHF RFID tag settings modification.
FIG. 7B shows another illustrative embodiment of a UHF RFID tag settings modification.

FIG. 7A shows an illustrative embodiment of a UHF RFID tag settings modification 700. The settings modification 700 includes sending 702, by a reader, a first command of a communication session with a transponder. The first command includes information that the system operates in the United States of America. Furthermore, the settings modification 700 includes various steps 704 performed by the transponder. These steps 704 include receiving the command, decoding or extracting the country information, adjusting the backscatter strength and the voltage limiter strength to fulfill USA-specific limitations, and transmitting responses to the reader while applying the modified settings until a next communication session, a next inventory round, a field reset, a change request, or another event occurs.

FIG. 7B shows another illustrative embodiment of a UHF RFID tag settings modification 706. The settings modification 706 includes sending 708, by a reader, a first command of a communication session with a transponder. The first command includes information that the system operates in the European Union. Furthermore, the settings modification 706 includes various steps 710 performed by the transponder. These steps 710 include receiving the command, decoding or extracting the country information, adjusting backscatter strength (i.e., reducing the strength) to fulfill EU-specific limitations, and transmitting responses to the reader while applying the modified setting until a next communication session, a next inventory round, a field reset, a change request, or another event occurs.

Figure 8:
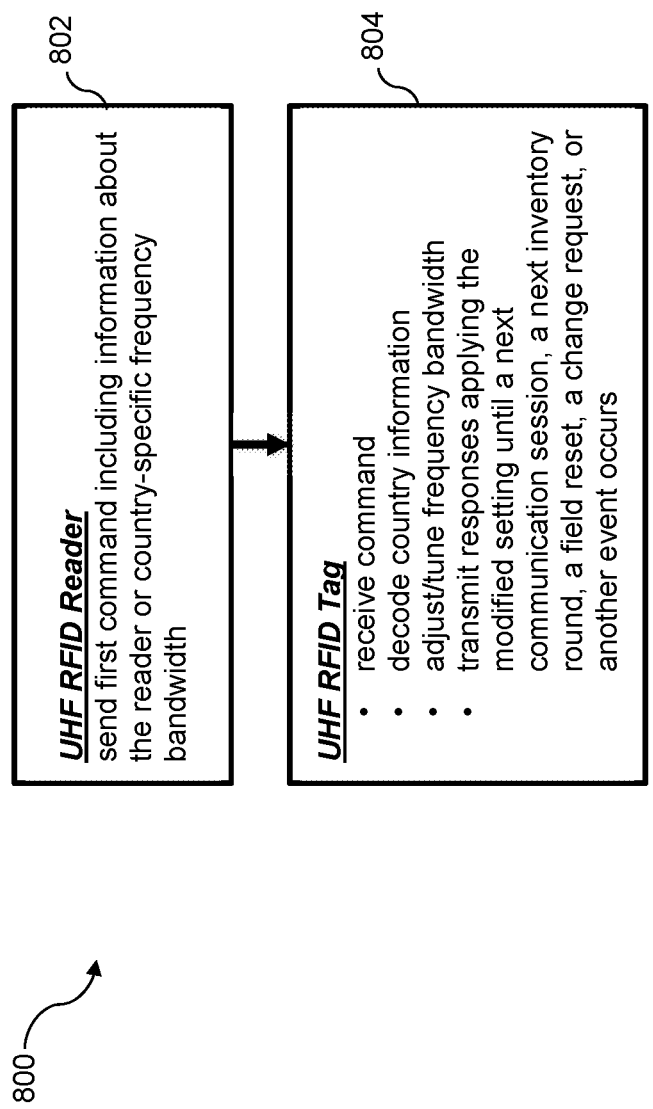
FIG. 8 shows a further illustrative embodiment of a UHF RFID tag settings modification.

FIG. 8 shows a further illustrative embodiment of a UHF RFID tag settings modification 800. The settings modification 800 includes sending 802, by a reader, a first command of a communication session with a transponder. The first command includes information about the reader (e.g., technical specifications) or a country-specific frequency bandwidth. Furthermore, the settings modification 800 includes various steps 804 performed by the transponder. These steps 804 include receiving the command, decoding or extracting the reader-specific or country-specific information, adjusting or tuning the frequency bandwidth in accordance with said information, and transmitting responses to the reader while applying the modified setting until a next communication session, a next inventory round, a field reset, a change request, or another event occurs.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 RFID transponder
102 receiver
104 controller
200 method of operating an RFID transponder
202 receiving, by a receiver comprised in an RFID transponder, a command from an external RFID reader, wherein the command is a first command transmitted by the RFID reader during a communication session and wherein said command comprises at least one parameter indicative of one or more modifiable settings of the RFID transponder
204 modifying, by a controller comprised in the RFID transponder, the settings of the RFID transponder in accordance with a value of said parameter
300 communication system
302 RFID transponder
304 RFID reader
400 RFID transponder
402 receiver
404 controller
406 modulator
408 transmitter
500 command transmission
502 transmitter (reader side)
504 receiver (transponder side)
506 broadcast command
600 transponder settings modification
602 command transmission by a reader
604 operations performed by the transponder
700 UHF RFID tag settings modification
702 command transmission by a UHF RFID reader
704 operations performed by the UHF RFID tag
706 UHF RFID tag settings modification
708 command transmission by a UHF RFID reader
710 operations performed by the UHF RFID tag
800 UHF RFID tag settings modification
802 command transmission by a UHF RFID reader
804 operations performed by the UHF RFID tag

The invention claimed is:

1. A radio frequency identification, RFID, transponder, comprising:
a receiver configured to receive a broadcast command from an external RFID reader, wherein the broadcast command is a first command transmitted by the RFID reader during a communication session between the external RFID reader and the RFID transponder, wherein said broadcast command comprises one or more modifiable settings in accordance with a value of a parameter indicative of hardware settings specific to the RFID reader, and wherein the hardware settings include voltage limiter settings and charge pump settings; and
a controller configured to modify the one or more modifiable settings of the RFID transponder in accordance with the hardware settings.

2. The RFID transponder of claim 1, wherein the hardware settings, internal state, and return link strength information specific to the RFID reader are specific to a predefined country or geographical region.

3. The RFID transponder of claim 1, wherein the hardware settings include transmitter settings and/or receiver settings.

4. The RFID transponder of claim 1, wherein the hardware settings include modulator settings.

5. The RFID transponder of claim 1, wherein the hardware settings include a frequency bandwidth in which the RFID transponder operates.

6. The RFID transponder of claim 1, being an RFID tag or an RFID card.

7. The RFID transponder of claim 1, wherein the modifiable settings include settings indicative of an internal state of the RFID transponder.

8. The RFID transponder of claim 1, wherein the modifiable settings include settings indicative of return link strength information.

9. A method of operating a radio frequency identification, RFID, transponder, comprising:
receiving, by a receiver comprised in the RFID transponder, a broadcast command from an external RFID reader, wherein the broadcast command is a first command transmitted by the RFID reader during a communication session between the external RFID reader and the RFID transponder, wherein said broadcast command comprises one or more modifiable settings in accordance with a value of a parameter indicative of hardware settings specific to the RFID reader, and wherein the hardware settings include voltage limiter settings and charge pump settings; and modifying, by a controller comprised in the RFID transponder, the one or more modifiable settings of the RFID transponder in accordance with the hardware settings.

10. The method of claim 9, wherein the hardware settings, internal state, and return link strength specific to the RFID reader are specific to a predefined country or geographical region.

11. The method of claim 9, wherein the hardware settings include transmitter settings and/or receiver settings.

12. The method of claim 9, wherein the hardware settings include modulator settings.

13. The method of claim 9, wherein the modifiable settings include settings indicative of an internal state of the RFID transponder.

14. The method of claim 9, wherein the modifiable settings include settings indicative of return link strength information.

* * * * *